(12) United States Patent
Lord et al.

(10) Patent No.: US 12,470,265 B2
(45) Date of Patent: Nov. 11, 2025

(54) SIGNAL PROCESSING METHOD

(71) Applicant: BRITISH TELECOMMUNICATIONS PUBLIC LIMITED COMPANY, London (GB)

(72) Inventors: Andrew Lord, London (GB); Anas Al Rawi, London (GB); Neil Parkin, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 7 days.

(21) Appl. No.: 18/261,707

(22) PCT Filed: Dec. 17, 2021

(86) PCT No.: PCT/EP2021/086580
§ 371 (c)(1),
(2) Date: Jul. 17, 2023

(87) PCT Pub. No.: WO2022/152508
PCT Pub. Date: Jul. 21, 2022

(65) Prior Publication Data
US 2024/0072853 A1    Feb. 29, 2024

(30) Foreign Application Priority Data

Jan. 18, 2021 (GB) ..................... 2100613

(51) Int. Cl.
*H04K 1/10* (2006.01)
*H04B 7/0456* (2017.01)
*H04L 27/28* (2006.01)

(52) U.S. Cl.
CPC ................. *H04B 7/0456* (2013.01)

(58) Field of Classification Search
CPC ............. H04B 7/0456; H04B 7/086
(Continued)

(56) References Cited

U.S. PATENT DOCUMENTS 10,069,617 B2   9/2018   Rawi et al.
11,838,069 B2   12/2023  Stigant et al.
(Continued)

OTHER PUBLICATIONS

Combined Search and Examination Report under Sections 17 and 18(3) for Great Britain Application No. 2100613.5, mailed on Oct. 8, 2021, 9 pages.
(Continued)

*Primary Examiner* — Phuong Phu
(74) *Attorney, Agent, or Firm* — EIP US LLP

(57) ABSTRACT

A method of transmitting precoded signals can include precoding an optical signal to produce a precoded optical signal, transmitting a precoded optical signal over an optical portion of a first transmission channel, converting the precoded optical signal to a first MIMO signal, transmitting the first MIMO signal over a wireless portion of the first transmission channel, transmitting the precoded optical signal over an optical portion of a second transmission channel, converting the precoded optical signal to a second MIMO signal; transmitting the second MIMO signal over a wireless portion of the second transmission channel; wherein the precoding takes account of both first channel state information associated with the first transmission channel and second channel state information associated with the second transmission channel.

11 Claims, 2 Drawing Sheets

(58) Field of Classification Search
USPC .......................................... 375/267, 297, 260
See application file for complete search history.

(56) References Cited

U.S. PATENT DOCUMENTS

| | | |
|---|---|---|
| 12,191,939 B2 | 1/2025 | Dai et al. |
| 2017/0026093 A1* | 1/2017 | Kim ........................ H04B 7/086 |
| 2024/0305340 A1 | 9/2024 | Rawi et al. |

OTHER PUBLICATIONS

International Search Report and Written Opinion for International Application No. PCT/EP2021/086580, mailed Mar. 14, 2022, 12 pages.

Li Y., et al., "Analogue Wireless Beamforming Exploiting the Fiber-Nonlinearity of Radio Over Fiber-Based C-RANs," IEEE Transactions on Vehicular Technology, Mar. 2019, vol. 68. No. 3, pp. 2802-2813.

Yang Y., "Mimo Radio-Over-Fibre Distributed Antenna System for Next Generation Wireless Communication," Apollo, University of Cambridge, Sep. 20, 2017, 155 pages.

International Preliminary Report on Patentability received for PCT Patent Application No. PCT/EP2021/086580, mailed on Jul. 27, 2023, 8 pgs.

* cited by examiner

SIGNAL PROCESSING METHOD

PRIORITY CLAIM

The present application is a National Phase entry of PCT Application No. PCT/EP2021/086580, filed Dec. 17, 2021, which claims priority from GB Patent Application No. 2100613.5, filed Jan. 18, 2021, each of which is hereby fully incorporated herein by reference.

TECHNICAL FIELD

The present disclosure relates to MIMO systems for use, for example, in wireless access networks.

BACKGROUND

In known wireless systems, cellular base stations transmit wireless MIMO signals across their respective cells. Specifically, each base station has multiple transmitters each of which transmits a wireless signal. Prior to transmission, each signal is precoded to reduce the effect of interference caused by the signals transmitted by the other transmitters at the base station. This provides improved signal to noise ratio. However, at the edges of the cell there is interference from signals transmitted by the base station of the neighboring cells.

Co-ordinated MIMO has been proposed as a solution to this problem. In coordinated MIMO the precoding applied to the signal takes into account the signals transmitted by a neighboring base station. Such methods are computationally complex and therefore expensive. Other proposed solutions include the use of dark fiber technology, edge computing and microwave technology. These proposed solutions are also costly.

SUMMARY

It is desirable to provide a signal processing method that overcomes and/or mitigates the above-mentioned and/or other disadvantages of conventional approaches.

According to a first aspect of the disclosure there is provided a method of transmitting precoded signals, the method comprising: precoding an optical signal to produce a precoded optical signal, transmitting a precoded optical signal over an optical portion of a first transmission channel, converting the precoded optical signal to a first MIMO signal; transmitting the first MIMO signal over a wireless portion of the first transmission channel; transmitting the precoded optical signal over an optical portion of a second transmission channel, converting the precoded optical signal to a second MIMO signal; transmitting the second MIMO signal over a wireless portion of the second transmission channel; where the precoding takes account of both first channel state information associated with the first transmission channel and second channel state information associated with the second transmission channel.

Embodiments of the disclosure enable a cost-effective method of reducing inter-cell interference and increasing signal to noise ratio across the network. Embodiments of the disclosure enable co-operative MIMO to be applied in the optical domain, rather than at base stations. The resulting method is less computationally complex and so less costly than prior methods. It also enables resources to be dynamically allocated and distributed to match traffic demands in networks. Furthermore, base station hardware design is simplified to a media convertor since all signal processing is conducted in the optical domain.

The precoded optical signal may be transmitted over the first and second transmission channels simultaneously. The method may further comprise measuring the first channel state information and/or the second channel state information. These measuring operations may be performed by user equipment. Transmitting the first MIMO signal over the wireless portion of the first transmission channel may be performed at a first MIMO transmitter apparatus. Transmitting the second MIMO signal over the wireless portion of the second transmission channel may be performed at a second MIMO transmitter apparatus.

Precoding the optical signal may comprise multiplying the optical signal by a precoder matrix. The precoder matrix may be derived from a first channel matrix containing the first state information and a second channel matrix containing the second channel state information. The precoder matrix may be derived using the formula:

$$P=([H_1H_2])^H([H_1H_2])([H_1H_2])^H)^{-1}$$

Where P is the precoder matrix, $H_1$ is the first channel matrix, $H_2$ is the second channel matrix and the superscript H indicates the Hermitian operator. $[H_1H_2]$ can be considered as the cooperative MIMO channel matrix and is the concatenation of $H_1$ and $H_2$.

The precoder P may be a generalized MIMO precoder which may perform both multiplexing and diversity combining (i.e. beamforming) transmission.

The method may further comprise transmitting the precoded optical signal from an optical line terminal to the first transmitter apparatus and the second transmitter apparatus via optical fiber. The method may further comprise splitting the transmitted precoded optical such that portions of the signal are received at the first and second transmitter apparatuses respectively. The splitting may be performed by an optical splitter. The signal received at the first transmitter apparatus may be substantially the same as the signal received at the second transmitter apparatus.

The precoding may be performed at the optical line terminal and may be performed by a digital signal processor. The precoding may be performed on a data signal received from a data mapper and encoder within the processor. The precoded signal may be passed through an inverse discrete Fourier transform and may be transmitted by an analogue from end of the optical line terminal.

Converting the precoded optical signal to a first MEMO signal may be performed at the first transmitter apparatus. Converting the precoded optical signal to a second MIMO signal may be performed at the second transmitter apparatus.

The first transmitter apparatus may be located at a first cellular base station and may comprise multiple transmitters. The first channel state information may be associated with the multiple transmitters at the first transmitter apparatus.

The second transmitter apparatus may be located at a second cellular base station and may comprise multiple transmitters. The second channel state information may be associated with the multiple transmitters at the second transmitter apparatus.

The precoded signal may have multiple components. Each of the transmitters at the first transmitter apparatus may transmit a signal derived from a respective one of the multiple components.

Each transmitter at the first transmitter apparatus may be paired with a respective transmitter at the second transmitter apparatus, such that each pair transmits the same signal. In other words, each transmitter at the first transmitter apparatus transmits the same signal as a respective one of the transmitters at the second transmitter apparatus.

The first MIMO signal and the second MIMO signal may be received by a mobile station located in a cell associated with the first base station or a cell associated with the second base station. The mobile station may be a mobile phone.

The method may further comprise applying a synchronization delay to the precoded optical signal which may be applied at the optical line terminal. The synchronization delay may be applied to the precoded optical signal transmitted to the first transmitter apparatus or the precoded optical signal transmitted to the second transmitter apparatus.

The method may further comprise determining the synchronization delay. This may take account of the time of flight of the precoded optical signals and/or the first MIMO signal and/or the second MIMO signal.

In some embodiments the precoding takes account of further channel state information, the further channel state information being associated with a transmission channel of one or more further transmitter apparatuses. In these embodiments the method may comprise converting the precoded optical signal to one or more further MIMO signals and transmitting the one or more further MIMO signals from the one or more further transmitter apparatuses respectively.

In embodiments in which the method comprises converting the precoded optical signal to M MIMO signals, M may be an integer greater than 2. The M MIMO signals may be transmitted by M transmitter apparatuses respectively, and the precoder matrix may be:

$$P=([H_1 H_2 \ldots H_M])^H([H_1 H_2 \ldots H_M])([H_1 H_2 \ldots H_M])^H)^{-1}$$

The number of cooperative cells may be optimized by an iterative optimization to balance latency, computational complexity and maintain a signal to noise ratio target. A Machine Learning Engine in the optical domain may be adopted to optimize the depth of MIMO cooperation.

According to a second aspect of the disclosure there is provided a system for transmitting precoded signals, the system comprising: a precoder adapted to precode an optical signal, where the precoding takes account of both first channel state information associated with a first transmission channel and second channel state information associated with a second transmission channel; an optical transmitter adapted to transmit the precoded optical signal over an optical portion of the first transmission channel and over an optical portion of the a second transmission channel, a first signal converter adapted to convert the precoded optical signal to a first MIMO signal; a second signal converter adapted to convert the precoded optical signal to a second MIMO signal; a first MIMO transmitter apparatus adapted to transmit the first MIMO signal over a wireless portion of the first transmission channel; and a second MIMO transmitter apparatus adapted to transmit the first MIMO signal over a wireless portion of the first transmission channel.

BRIEF DESCRIPTION OF THE DRAWINGS

Specific embodiments of the disclosure will now be described, for illustration only, and with reference to the appended drawings in which.

DETAILED DESCRIPTION

Figure 1:
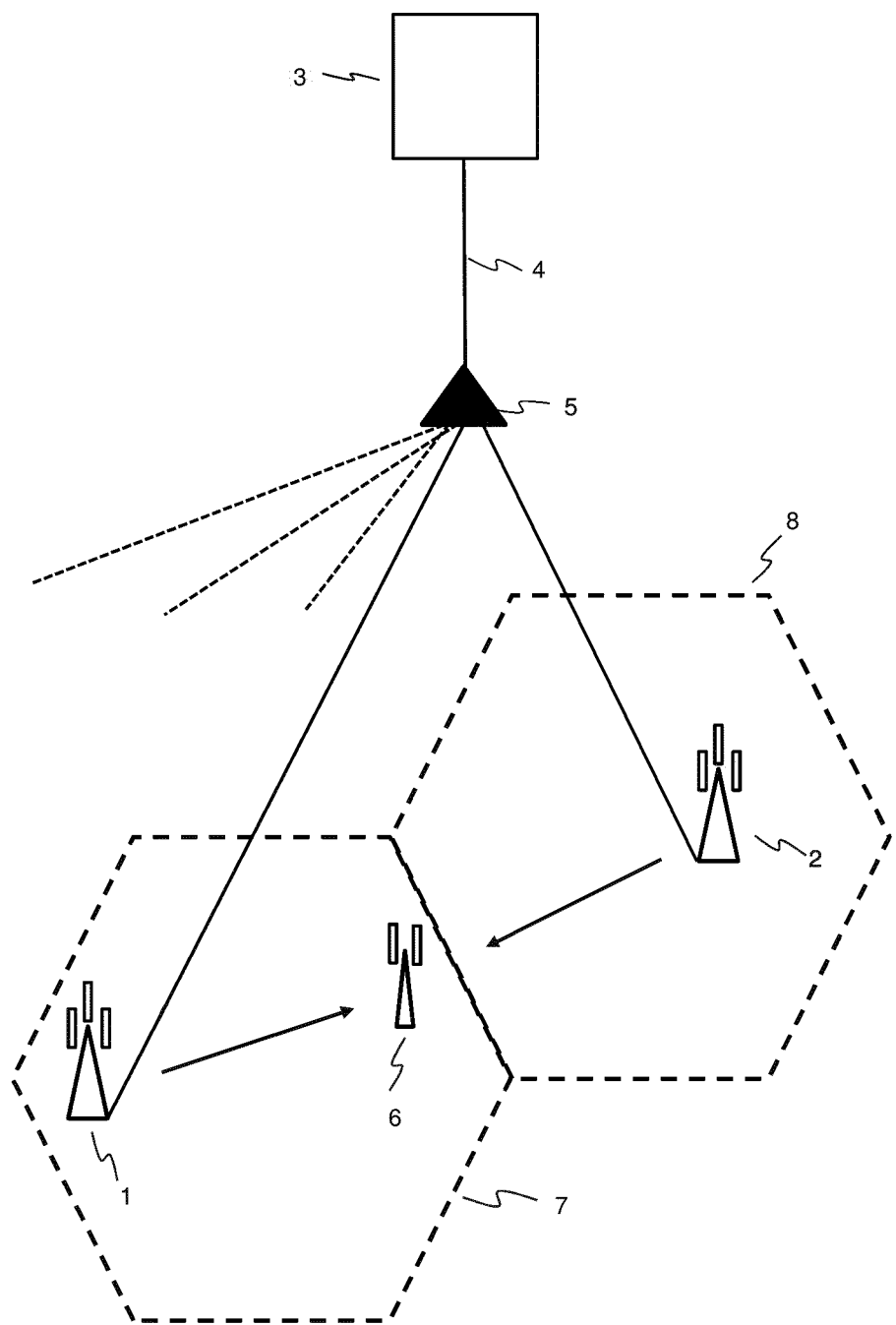
FIG. 1 is a schematic view of a system in accordance with the disclosure.

FIG. 1 shows an Optical Line Terminal (OLT) 3 which is connected to two cellular base stations 1 and 2 via an optical fiber 4. In the presently described embodiment there are two base stations, however embodiments of the disclosure can be used with any number of base stations, as implied by the dotted lines emanating from splitter 5 in FIG. 1. In use the OLT 3 transmits optical signals along the optical fiber 4. The signals are directed to the intended base station by an optical splitter 5. The optical signals are converted to MIMO signals at the base station 1, 2 and transmitted from the base station 1, 2, wirelessly, to a mobile station 6 located within the cell 7 of base station 1, but close to the cell 8 of base station 2. Each base station has a transmitter array containing three transmitters a, b, c. As interference takes place between the wireless MIMO transmitted signals, it is desirable to apply precoding to the signals. This precoding reduces the distortion to each MIMO signal caused by interference from the other two MIMO signals transmitted from the same base station. As would be understood by the person skilled in the art, this precoding requires knowledge of the channel state information of the MIMO signals. In the case of base station 1, this is determined by transmitting training signals from the three transmitters a, b, c of base station 1 and measuring the received signal at a receiver, such as mobile station 6, located in cell 7. this type of precoding will be referred to as simple precoding.

In some known systems the precoding also takes into account interference caused by the MIMO signals transmitted by the other base station. In other words, the precoding reduces the distortion to each MIMO signal caused not only by the other two signals transmitted from base station 1, but also by the three signals transmitted by base station 2. This requires knowledge of the channel state information associated with the MIMO channels of both base station 1 and base station 2. This type of precoding will be referred to as co-operative precoding. In known systems this co-operative precoding is performed at each of the base stations 1 and 2.

In embodiments of this disclosure, by contrast, co-operative precoding is performed at the OLT. In other words, it is performed in the optical domain (i.e. on the optical signals, rather than on the wireless signals). A general overview of the method according to the disclosure will now be described.

A first operation in performing the method of the disclosure can be to transmit training signals. This comprises transmitting optical signals from the OLT 3 to base station 1 which converts the optical signals to MIMO signals and transmits them from the three transmitters a, b, c. A receiver device located in cell 7 receives the signals and reports them to the OLT 3. The digital signal processor (DSP) of the OLT 3 uses the received signals to determine a channel matrix $H_1$. As would be understood by the skilled person, $H_1$ contains the channel state information associated with the wireless channel used by the base station 1, and takes the following form:

$$\begin{bmatrix} h_{11} & h_{12} & h_{13} \\ h_{21} & h_{22} & h_{23} \\ h_{31} & h_{32} & h_{33} \end{bmatrix}_1$$

The elements $h_{ij}$ represent the coupling between the MIMO transmitter array of base station 1 and mobile station 6. The signal received by the mobile station 6 is related to the signal transmitted by the transmitter array of base station 1 as follows:

$$Y_1 = H_1 X_1 + N_1$$

Which, in expanded form is:

$$\begin{bmatrix} y_1 \\ y_2 \\ y_3 \end{bmatrix}_1 = \begin{bmatrix} h_{11} & h_{12} & h_{13} \\ h_{21} & h_{22} & h_{23} \\ h_{31} & h_{32} & h_{33} \end{bmatrix}_1 \begin{bmatrix} x_1 \\ x_2 \\ x_3 \end{bmatrix}_1 + \begin{bmatrix} n_1 \\ n_2 \\ n_3 \end{bmatrix}$$

In the above equations, $Y_1$ is the signal received by the mobile station 6, $H_1$ is the channel matrix, $X_1$ is the signal transmitted from OLT 3 to base station 1 and $N_1$ represents the noise in the received signal.

The OLT also transmits a further set of training signals which are directed by the optical splitter 5 to base station 2. Similarly, base station 2 converts the optical signals to MIMO signals and transmits them from its array of three transmitters a, b, c. Mobile station 6 located in cell 7 receives the MIMO signals and reports them to the OLT 3. The OLT uses the received signals to determine a channel matrix $H_2$. As would be understood by the skilled person, $H_2$ contains the channel state information associated with the wireless channel used by the base station 2. $H_2$ is used to determine a precoding matrix to be applied to the optical signals prior to transmission from the OLT.

The signal received by the mobile station 6 is related to the signal transmitted by the transmitter array of base station 2 as follows:

$$Y_2 = H_2 X_2 + N_2$$

$$\begin{bmatrix} y_1 \\ y_2 \\ y_3 \end{bmatrix}_2 = \begin{bmatrix} h_{11} & h_{12} & h_{13} \\ h_{21} & h_{22} & h_{23} \\ h_{31} & h_{32} & h_{33} \end{bmatrix}_2 \begin{bmatrix} x_1 \\ x_2 \\ x_3 \end{bmatrix}_2 + \begin{bmatrix} n_1 \\ n_2 \\ n_3 \end{bmatrix}$$

In the above equations, $Y_2$ is the signal received by the mobile station 6, $H_2$ is the channel matrix, $X_2$ is the signal transmitted from OLT 3 to base station 2 and $N_2$ represents the noise in the received signal.

Therefore, if the same signal X is transmitted from the respective arrays of base stations 1 and 2, the mobile station 6 will receive signal Y in the following equation:

$$\begin{bmatrix} y_1 \\ y_2 \\ y_3 \end{bmatrix} = \left\{ \begin{bmatrix} h_{11} & h_{12} & h_{13} \\ h_{21} & h_{22} & h_{23} \\ h_{31} & h_{32} & h_{33} \end{bmatrix}_1 \begin{bmatrix} h_{11} & h_{12} & h_{13} \\ h_{21} & h_{22} & h_{23} \\ h_{31} & h_{32} & h_{33} \end{bmatrix}_2 \right\} \begin{bmatrix} x_1 \\ x_2 \\ x_3 \end{bmatrix} + \begin{bmatrix} n_1 \\ n_2 \\ n_3 \end{bmatrix}$$

As can be seen, received signal Y comprises components from both base stations 1 and 2.

The channel matrices $H_1$ and $H_2$ are used to determine precoding matrix P to be applied to the optical signals to be transmitted by the OLT 3. This has the effect of reducing the interference to each MIMO signal caused by (i) the other two MIMO signals transmitted from the same base station and (ii) the three MIMO signals transmitted from the other base station. Precoding matrix P is determined using the following equation:

$$P = ([H_1 H_2])^H ([H_1 H_2])([H_1 H_2])^H)^{-1}$$

The superscript H indicates the Hermitian. The first component of P removes the interference from the other transmitters in base station 1 and the second component of P removes the interference from the other transmitters in base station 2.

The optical signals to be transmitted by the OLT are multiplied by precoding matrix P and the resulting precoded signals are transmitted from the OLT 3 to both base stations 1 and 2. Therefore, the signal sent from the OLT to transmitter a of base station 1 is the same as that sent by the OLT to transmitter a of base station 2. Similarly, the signal sent from the OLT to transmitter b of base station 1 is the same as that sent by the OLT to transmitter b of base station 2. Similarly, the signal sent from the OLT to transmitter c of base station 1 is the same as that sent by the OLT to transmitter c of base station 2.

The optical signals are converted into MIMO signals at base stations 1 and 2 and transmitted by base stations 1 and 2. Mobile station 6 receives the signal from both base stations 1 and 2. This received signal has a higher signal to noise ratio than if simple MIMO precoding, rather than co-operative MIMO precoding, had been used.

In additional to the method described in the above general overview, the presently described embodiment has further features.

The base stations 1 and 2 are not necessarily equidistant from the OLT 3. Furthermore, the base stations 1 and 2 are not necessarily equidistant from the mobile station 6. Therefore, signals transmitted simultaneously from the OLT which go through different base stations, will not necessarily arrive at the mobile station at the same time. This will reduce the effectiveness of the precoding. To address this, a delay can be introduced into the signals so that the signals arrive at the mobile station at the same time. The time delay will be referred to as the cyclic extension. It is calculated as follows.

The duration of a symbol $T_s$ can be determined from the tone spacing ($\Delta f$) using the equation:

$$T_s = \frac{1}{\Delta f}$$

If N is the number of tones per carrier, the duration of each tone $t_s$ is given by:

$$t_s = \frac{T_s}{N},$$

If the time taken for the optical signals to travel from the OLT 3 to base station 1 is $t_{f1}$ and the time taken for the optical signals to travel from the OLT 3 to base station 2 is $t_{f2}$, the cyclic extension CE opt is as follows:

$$CE_{opt} = \left\lceil \frac{\max\{t_{f1}, t_{f2}\}}{t_s} \right\rceil,$$

Where the operator brackets $\lceil x \rceil$, provides the nearest integer greater than x.

Similarly, if the time taken for the MIMO signals to travel from base station 1 to mobile station 6 is $t_{f1}$ and the time taken for the MIMO signals to travel from base station 2 to mobile station 6 is $t_{f2}$, the cyclic extension $CE_{opt}$ is as follows:

$$CE_{opt} = \left\lceil \frac{\max\{t_{f1}, t_{f2}\}}{t_s} \right\rceil,$$

Determining optical and MIMO cyclic extensions separately results in a more accurate determination.

Figure 2:
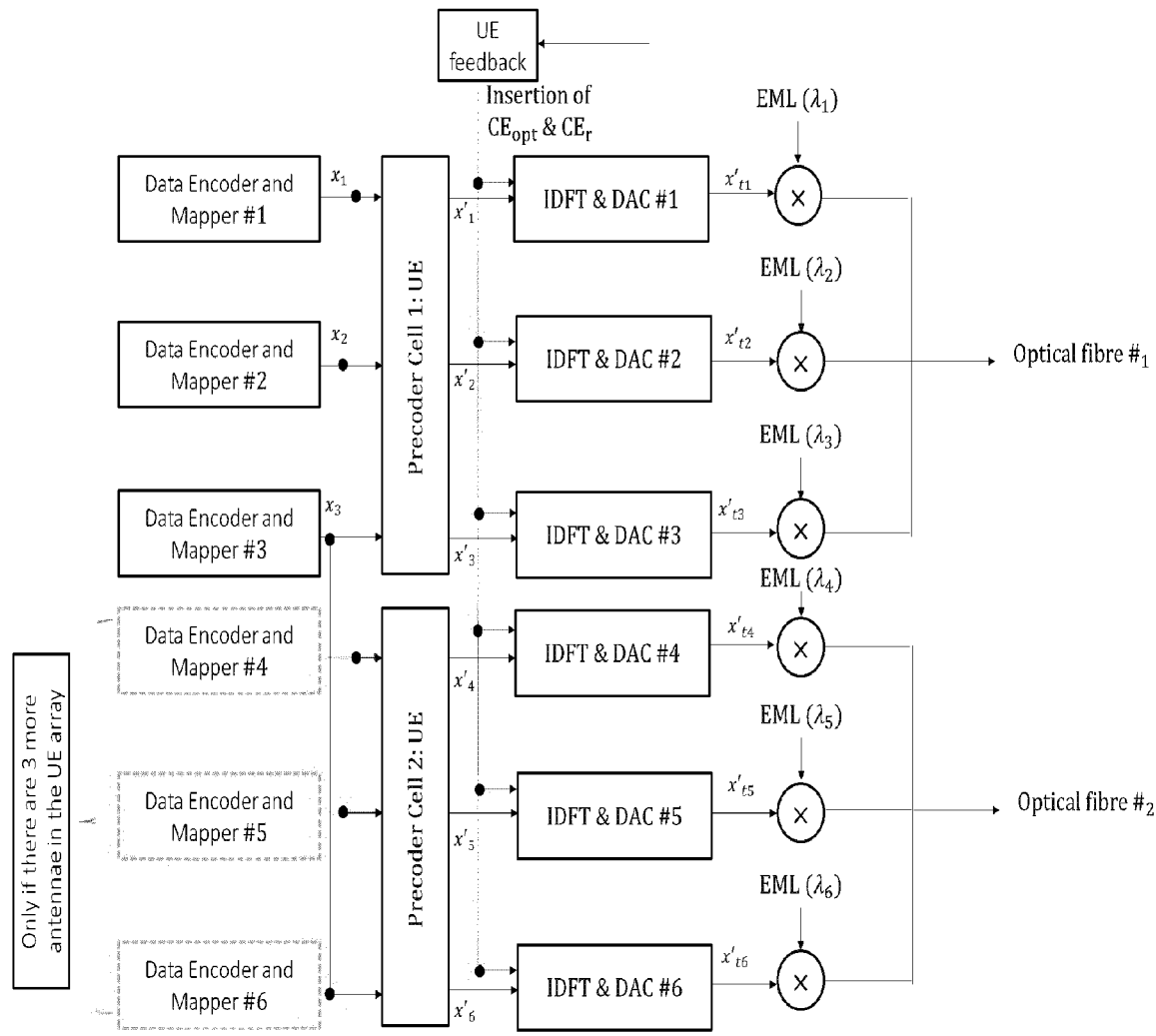
FIG. 2 is a block diagram showing the functions within an OLT adapted to perform embodiments of the disclosure.

FIG. 2 is a schematic block diagram of the DSP of an OLT in accordance with the disclosure. Its functionality will now be summarized. Data Encoder and Mapper modules #1, #2 and #3 each output a complex data signal $x_i$. Data Encoder and Mapper modules #4, #5 and #6 are not active in the presently described embodiment as the base stations only have three transmitters. In embodiments where the base stations have more transmitters, a corresponding number of Data Encoder and Mapper modules would be active.

Complex data signal $x_i$ is passed into both Precoder Cell 1 and Precoder Cell 2. Precoding Cells 1 and 2 each multiply the data signals $x_i$ by a precoding matrix, as described above, and output the resulting signals to respective IDFT & DAC (Inverse Discrete Fourier Transform & Digital to Analogue Converter) modules. Optical and MIMO cyclic extensions are determined by the UE feedback module in the manner described above, using data received from mobile station 6. The determined optical and MIMO cyclic extensions are input into the IDFT & DAC modules which add them to the signals and output the resulting signals to lasers (EML). The resulting optical signals are transmitted on respective optical fibers to base stations 1 and 2.

The invention claimed is:

1. A method of transmitting precoded signals, the method comprising:
   precoding an optical signal to produce a precoded optical signal;
   transmitting a precoded optical signal over an optical portion of a first transmission channel;
   converting the precoded optical signal to a first multiple-input multiple-output (MIMO) signal;
   transmitting the first MIMO signal over a wireless portion of the first transmission channel;
   transmitting the precoded optical signal over an optical portion of a second transmission channel;
   converting the precoded optical signal to a second MIMO signal; and
   transmitting the second MIMO signal over a wireless portion of the second transmission channel,
   wherein the precoding takes account of both first channel state information associated with the first transmission channel and second channel state information associated with the second transmission channel,
   wherein precoding the optical signal comprises multiplying the optical signal by a precoder matrix derived from a first channel matrix containing the first channel state information and a second channel matrix containing the second channel state information.

2. The method as claimed in claim 1, wherein the precoder matrix is derived using the formula:

$$P = ([H_1 H_2])^H ([H_1 H_2])([H_1 H_2])^H)^{-1}$$

where P is the precoder matrix, $H_1$ is the first channel matrix, $H_2$ is the second channel matrix, and the superscript H indicates the Hermitian.

3. The method as claimed in claim 1, wherein the precoding is performed at an optical line terminal.

4. The method as claimed in claim 1, wherein converting the precoded optical signal to a first MIMO signal is performed at a first MIMO transmitter apparatus and converting the precoded optical signal to a second MIMO signal is performed at a second MIMO transmitter apparatus.

5. The method as claimed in claim 1, further comprising applying a synchronization delay to the precoded optical signal.

6. The method as claimed in claim 5, wherein the synchronization delay takes account of a time of flight of the precoded optical signal, the first MIMO signal, and the second MIMO signal.

7. The method as claimed in claim 1, further comprising converting the precoded optical signal to one or more further MIMO signals, and transmitting the one or more further MIMO signals from one or more further transmitter apparatuses, respectively.

8. A system for transmitting precoded signals, the system comprising:
   a precoder adapted to precode an optical signal, where the precoding takes account of both first channel state information associated with a first transmission channel and second channel state information associated with a second transmission channel;
   an optical transmitter adapted to transmit the precoded optical signal over an optical portion of the first transmission channel and over an optical portion of the second transmission channel,
   a first signal converter adapted to convert the precoded optical signal to a first multiple-input multiple output (MIMO) signal;
   a second signal converter adapted to convert the precoded optical signal to a second MIMO signal;
   a first MIMO transmitter apparatus adapted to transmit the first MIMO signal over a wireless portion of the first transmission channel; and
   a second MIMO transmitter apparatus adapted to transmit the second MIMO signal over a wireless portion of the second transmission channel,
   wherein the precoder is adapted to precode the optical signal by multiplying the optical signal by a precoder matrix derived from a first channel matrix containing the first channel state information and a second channel matrix containing the second channel state information.

9. A non-transitory computer-readable storage medium storing instructions which, when executed by a computer system, cause the computer system to carry out the method as claimed in claim 1.

10. A method of transmitting precoded signals, the method comprising:
   precoding an optical signal to produce a precoded optical signal;
   transmitting a precoded optical signal over an optical portion of a first transmission channel;
   converting the precoded optical signal to a first multiple-input multiple-output (MIMO) signal;
   transmitting the first MIMO signal over a wireless portion of the first transmission channel;
   transmitting the precoded optical signal over an optical portion of a second transmission channel;
   converting the precoded optical signal to a second MIMO signal; and
   transmitting the second MIMO signal over a wireless portion of the second transmission channel,
   wherein the precoding takes account of both first channel state information associated with the first transmission channel and second channel state information associated with the second transmission channel, and
   wherein the method further comprises converting the precoded optical signal to one or more further MIMO signals, and transmitting the one or more further MIMO signals from one or more further transmitter apparatuses, respectively.

11. A system for transmitting precoded signals, the system comprising:
- a precoder adapted to precode an optical signal, where the precoding takes account of both first channel state information associated with a first transmission channel and second channel state information associated with a second transmission channel;
- an optical transmitter adapted to transmit the precoded optical signal over an optical portion of the first transmission channel and over an optical portion of the second transmission channel,
- a first signal converter adapted to convert the precoded optical signal to a first multiple-input multiple output (MIMO) signal;
- a second signal converter adapted to convert the precoded optical signal to a second MIMO signal;
- a first MIMO transmitter apparatus adapted to transmit the first MIMO signal over a wireless portion of the first transmission channel; and
- a second MIMO transmitter apparatus adapted to transmit the second MIMO signal over a wireless portion of the second transmission channel, and
- wherein the precoder is further adapted to convert the precoded optical signal to one or more further MIMO signals, and one or more further transmitter apparatuses are adapted to transmit the one or more further MIMO signals, respectively.

* * * * *